W. E. MAGIE & W. FERRIS.
HYDRAULIC TRANSMISSION DEVICE.
APPLICATION FILED JAN. 8, 1914.

1,212,655.

Patented Jan. 16, 1917.
5 SHEETS—SHEET 4.

Witnesses.
Edward T. Wray.
General Huth

Inventors.
William E. Magie.
Walter Ferris
by Parker & Carter
Attorneys.

W. E. MAGIE & W. FERRIS.
HYDRAULIC TRANSMISSION DEVICE.
APPLICATION FILED JAN. 8, 1914.

1,212,655.

Patented Jan. 16, 1917.
5 SHEETS—SHEET 5.

Witnesses.
Edward T. Wray.
Ginera Hurth

Inventors.
William E. Magie.
Walter Ferris.
by Parker & Carter
Attorneys.

UNITED STATES PATENT OFFICE.

WILLIAM E. MAGIE, OF EVANSVILLE, INDIANA, AND WALTER FERRIS, OF MILWAUKEE, WISCONSIN.

HYDRAULIC TRANSMISSION DEVICE.

1,212,655.  Specification of Letters Patent.  Patented Jan. 16, 1917.

Application filed January 8, 1914. Serial No. 810,928.

*To all whom it may concern:*

Be it known that we, WILLIAM E. MAGIE and WALTER FERRIS, citizens of the United States, residing, respectively, at Evansville, in the county of Vanderburg and State of Indiana, and at Milwaukee, in the county of Milwaukee and State of Wisconsin, have invented a certain new and useful Improvement in Hydraulic Transmission Devices, of which the following is a specification.

Our invention relates to a varying speed hydraulic transmission device.

One object of our invention is to furnish means whereby the adjustments may be made from time to time with the least possible effort.

Another object of our invention is to provide means whereby the system may be kept for working purposes effectively full of driving fluid with a maximum freedom of movement of the parts, or in other words, a maximum leakage and a minimum of packing or other such fluid retaining devices about the moving parts.

Another object of our invention is to provide a series of associated cylinders with coöperating pistons at each end of each cylinder.

Another object of our invention is to provide working cylinders with radial or lateral openings to receive or discharge the driving fluid as distinguished from endwise openings.

Another object of our invention is to provide a valve or port ring which entirely surrounds such rotating cylinders.

Another object of our invention is to provide means whereby the pressure on opposite sides of the driving shaft on which such cylinders are mounted is equalized.

Another object of our invention is to provide means whereby the excess pressure in the driving part due to any cause such as abnormal interference from the circulatory system of the driven part may be relieved.

Another object of our invention is to provide piston driving plates permanently inclined at a predetermined angle.

Another object of our invention is to provide adjustable driving and driven parts so as to increase the range of adjustment.

Another object of our invention is to provide various minor devices such as means for adjusting the parts, means for quieting the driving fluid and the like.

These and the other objects of our invention are carried out in the device of the accompanying drawings, which, however, is but one of many illustrations of the invention, and it is here set forth and described only as a means of explaining the invention and not as a limitation, for we have contemplated the application of our invention to very different forms of structures where nevertheless many of its features would be retained though in connection with structures of greatly varying form.

With this understanding we will refer to the accompanying drawings illustrating one form or one application of our invention, wherein—

Like parts are indicated by the same letter in all the figures.

In the preferred form of our device we use a driving part and a driven part which are substantially identical, and therefore the illustrative description of one is all that is necessary, though the driven part may in effect consist of but one-half of the driving part, but here again special description is unnecessary.

Figure 1:
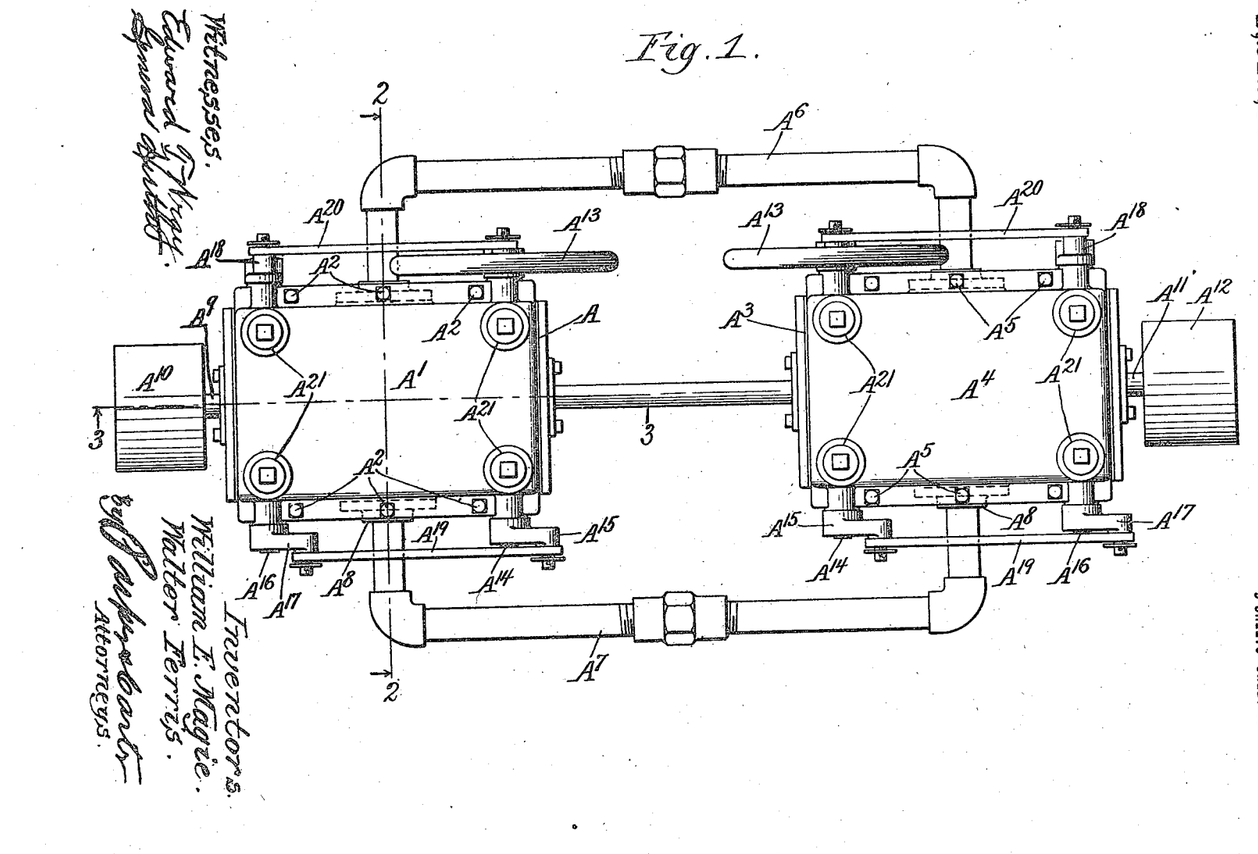
Figure 1 is a plan view.

For the sake of convenience and simplicity we will, first, referring to Fig. 1, describe the outside appearance of the machine and we will subsequently turn to the inclosed parts and describe them at greater length. A is a pump housing having a cover $A^1$ held in position by the cap screws $A^2$. $A^3$ is a motor housing having a cover $A^4$ held in position by the cap screws $A^5$. $A^6$, $A^7$ are conduits communicating at either end with the flanged collars $A^8$ on the walls of the housings A and $A^3$ to form with them a circulatory system. $A^9$ is a pump shaft extending into the pump housing A to there communicate with a driving part to be subsequently described and provided with the pulley $A^{10}$ whereby the pump may be driven from any suitable source of power. $A^{11}$ is a motor shaft projecting from the motor housing $A^3$ carrying inside the housing a driven part subsequently to be described and provided with a pulley $A^{12}$ whereby the motor may be made to operate any desired machinery or rotary part. $A^{13}$ are controlling hand wheel wheels mounted on the shafts $A^{14}$ which extend into and through the housings A and $A^3$ and have cranks $A^{15}$ mounted on the opposed ends thereof. $A^{16}$ are similar shafts extending into and through the housings A and $A^3$ and provided with cranks $A^{17}$, $A^{18}$, which cranks are angularly spaced and connected by the driving links $A^{19}$, $A^{20}$ as shown with either the cranks $A^{15}$ or hand wheel $A^{13}$ so that the rotation of the hand wheel will rotate both shafts. $A^{21}$ are handholes or inspection holes whereby access may be had to the interior of the housing and whereby oil may be introduced when necessary.

Referring now to our device as shown in Figs. 2 to 8 inclusive, we have shown and will describe only one of the two members, preferably the pump, since a description of it will suffice for a description of the motor, owing to the similarity of both. The housing A is closed at either end by the caps or end walls B which are centrally perforate and apertured to contain the ball bearings $B^1$ which support the pump shaft $A^9$. $B^2$ are spacing rings located in the central aperture and abutting against the bearings $B^1$, and $B^3$ are flexible packing disks containing the shaft and held in position by the packing plates $B^4$. $B^5$ are sleeves projecting inwardly from the casing ends B, closely surrounding, but out of contact with, the shaft $A^9$ and provided with semicircular flanges or ribs $B^6$ located on the upper sides thereof. $B^7$, $B^8$ are adjustable or rotatable wedge plates rotatably mounted at either end of the casing on the sleeves $B^5$, forming with the parts to be described inclined thrust or cam plates. These plates are recessed on their outer sides said recesses being provided with downwardly depending walls or segmental flanges $B^{20}$ which engage the flanges $B^6$ on the sleeves $B^5$. $B^9$ is a worm gear mounted on the wedge plate $B^7$ and in mesh with the right-handed worm $B^{10}$ on the shaft $A^{16}$. $B^{11}$ is a worm gear mounted on the wedge plate $B^8$ in mesh with a left-handed worm $B^{12}$ on the shaft $A^{14}$. $B^{21}$ are ball bearings interposed between the caps B and the wedge plates $B^7$, $B^8$. $B^{13}$ are bearing surfaces inclined to the axis of the wedge plates $B^7$, $B^8$ and adapted to support the annular ball bearings $B^{14}$ which are also inclined and which carry geared, socket, or rotary thrust plates $B^{15}$, $B^{16}$, which plates are held in position with respect to the ball bearings and the wedge plates by the annular collars $B^{17}$. $B^{18}$ are connecting rod sockets held in position by the screws $B^{19}$ on the piston plates $B^{15}$, $B^{16}$ and spaced about ball bearings $B^{22}$ on the shaft $A^9$ by the spacing rings $B^{23}$.

C is a so-called cylinder barrel rigidly attached to and rotating with the shaft $A^9$ and containing spaced about it the cylinders $C^1$ preferably uneven in number and as here shown seven in number and provided with centrally disposed ports $C^2$ extending radially from each of the cylinders $C^1$ out to the outer surface of the periphery of the barrel C. $C^3$, $C^4$ are opposed pistons slidably mounted in each of the cylinders $C^1$ and provided with ball-ended connecting rods $C^5$, $C^5$ held in spherical bearings therein by the screw plugs $C^6$ and in spherical bearing blocks $C^7$ in each of the connecting rod sockets $B^{18}$ by the screw plug $C^8$. $C^9$ are gears on the opposed ends of the piston barrel C in mesh with the geared socket plates $B^{15}$ $B^{16}$ to cause said plates and said piston barrel to rotate in unison. $C^{16}$ is a valve port ring surrounding and making a running fit with a rotating cylinder barrel C and held against rotation by the sleeves $C^{11}$, $C^{12}$ which pass through the walls of the housing A and are in slidable engagement with the flanged sleeves $A^8$ and in register with the conduits $A^6$, $A^7$. It will be noted that these sleeves $C^{11}$, $C^{12}$ are free to move about within comparatively narrow limits with respect to the walls of the casing and free to move slidably with respect to the valve ring $C^{10}$, thus permitting movement of the valve ring on the shaft with respect to the housing and circulatory system without danger of binding or cramping. The valve ring, it will be noted, contains two crescent-shaped ports $C^{13}$, $C^{14}$ in communication respectively with the sleeves $C^{11}$, $C^{12}$ and conduits $A^6$, $A^7$. These ports are located on opposed sides of the cylinder barrel and in communication with certain of the cylinders through the ports $C^2$ but are separated each from the other by the closed surfaces or dead surfaces or dead points $C^{15}$, $C^{16}$ at the top and bottom of the valve ring, which surfaces or areas are in close contact with the cylinder barrel and of slightly greater extent than the width of any cylinder discharge passage port.

Figure 2:
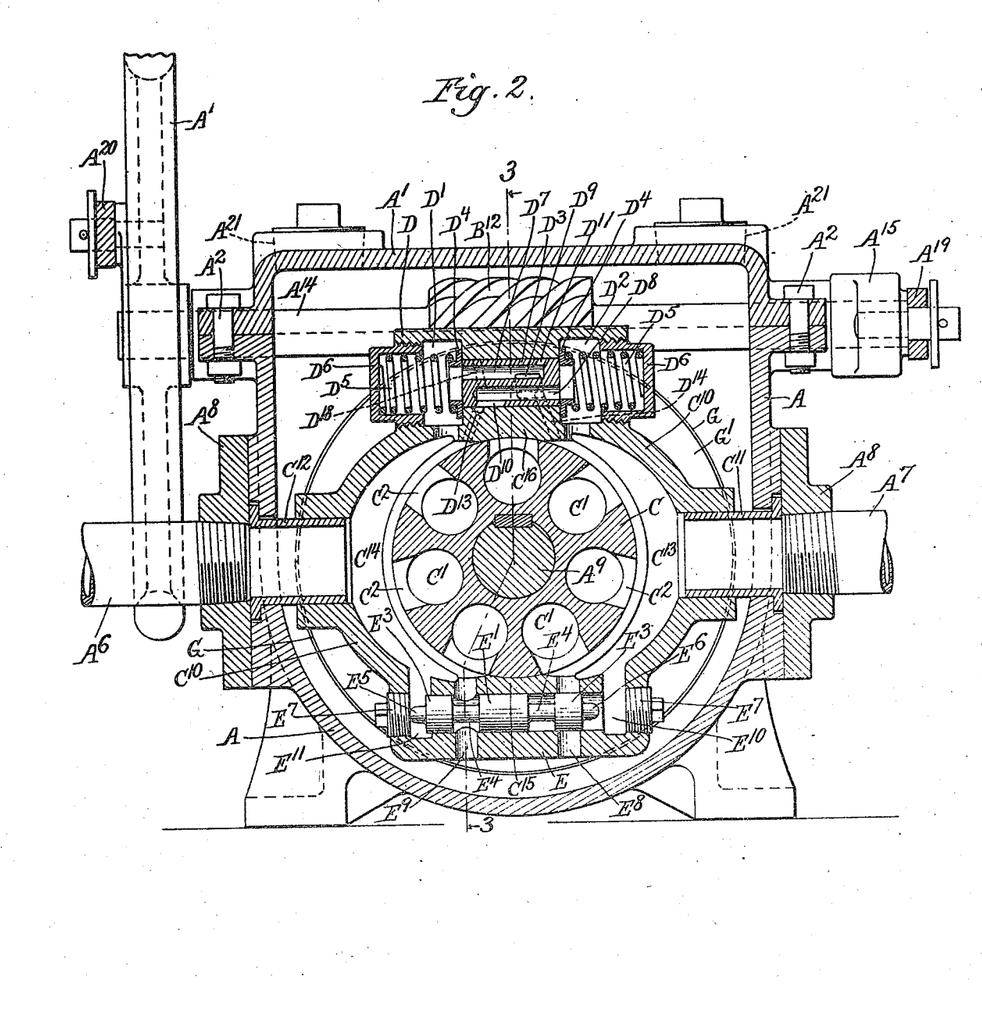
Fig. 2 is a cross section on the line 2—2 of Figs. 1 and 3.

D is a housing integral with the valve port ring and containing the pressure chamber $D^1$, $D^2$, the pressure $D^1$ communicating with the crescent-shaped port $C^{14}$ and the pressure $D^2$ communicating with the crescent-shaped port $C^{13}$. $D^3$ is a cylindrical plug slidably mounted in the housing D and of such length when in the neutral position as indicated in Fig. 2, its ends are flush with the sides of the pressure chambers D, $D^2$ respectively, thus this plug effectively separates these two chambers. $D^4$ are flanged collars held against the opposed walls of the pressure chamber $D^1$, $D^2$ and opposed ends of the plug $D^3$ by the springs $D^5$. $D^6$ are adjusting caps screw-threaded in the housing D and engaging one end of the spring $D^5$ forming a portion of the pressure chamber $D^1$, $D^2$. $D^7$, $D^8$ are pressure relief passages extending into the plug $D^3$ and communicating respectively with the pressure chamber $D^1$, $D^2$. $D^{17}$, $D^{18}$ are pressure relief ports projecting through the wall of the plug $D^3$ communicating respectively with the passages $D^7$, $D^8$ and closed by the wall of the housing D when the plug is in the position shown in Fig. 2, but free to discharge respectively into the pressure chambers $D^1$, $D^2$ when the plug is forced to the right-hand or to the left by the pressure in the opposed chamber. $D^{11}$, $D^{12}$ are balance ports arranged in pairs in the valve port ring on the opposed sides thereof, the ports $D^{11}$ being one on either side of the port $C^{14}$ and the ports $D^{12}$ being one on either side of the port $C^{13}$. The port $D^{11}$ is connected by means of a passage $D^{13}$ with the port $D^{10}$, passage $D^8$, pressure $D^2$ and crescent-shaped port $C^{13}$. The port $D^{12}$ is connected by means of the passage $D^{14}$ with a port $D^9$ in the wall of the passage $D^7$ thence to the pressure chamber $D^1$ and port $C^{14}$. The combined area of the two ports $D^{11}$, $D^{12}$ is equal respectively to the area of the ports $C^{13}$, $C^{14}$ so that since they are connected across the valve ring the pressures on the opposed sides of the valve ring balance and there is no undue pressure on either side of the valve ring against the cylinder barrel, such as might be caused by the unbalanced pressure on one side or the other. Thus the valve ports $C^{13}$, $C^{14}$ are each counterbalanced by the balance chambers $D^{11}$ or $D^{12}$ as the case may be on the opposed side of the barrel. There is no side pressure between the barrel and the valve ring in which it rotates. This arrangement forms in effect an equalizing means together with a pressure relief means and an adjusting means since the movement of the plug in the travel chamber or pressure chambers before releasing the pressure absolutely will equalize it, tending to adjust the varying pressure by a slight variation in the volume of the pressure chambers. The piston or plug forms what is in effect the pressure yielding wall and when moved to the end of its excursion is provided with what might be called an intermittent by-pass.

E is a housing located at the bottom of the valve port ring. This housing is longitudinally bored along the horizontal line at right angles to the axis of the valve ring and has traveling therein the combined piston made up of a central plunger $E^1$ and end plungers $E^2$, $E^3$ connected by the rods $E^4$ as shown and provided at either end with stop lugs $E^5$, $E^6$. The bore in which this combined piston is slidably mounted is closed at either end by the plugs $E^7$. Passages $E^8$, $E^9$ lead respectively from the ports $C^{13}$, $C^{14}$ through the housing E and communicate with the interior of the housing A outside of the valve ring, these passages being controlled by the members $E^2$, $E^3$. The plunger $E^1$ is subject at either end to the pressures prevailing in the ports $C^{13}$, $C^{14}$ respectively since chambers $E^{10}$, $E^{11}$ in line with the plunger communicate with these ports. The result is that when the pressure in one port is greater than the pressure in the other, it forces the piston away closing the passage leading from the port through the housing and opening the passage leading through the housing to the other port, as shown in Fig. 2. The pressure in $C^{13}$ is high, and in $C^{14}$ is low. The piston moves to the left. The passage $E^8$ is closed, the passage $E^9$ is open, and leakage in the housing A will return to the system being sucked in through the passage $E^9$ into the port $C^{14}$ by the partal vacuum therein.

G is a splash shield rigidly attached to the flange $G^1$ about the valve ring. This splash shield is provided with apertures $G^2$ on its lower side and is inwardly constricted or flanged at $G^3$ to engage the annular slots in the wedge plates and contain or separate the rapidly moving power producing parts from the main body of oil in the housing and thus prevent frothing or whipping up of the oil.

The use and operation of our invention can be conveniently described in connection with a more extended discussion of the several elements which go to make up the complete structure here illustrated.

Figure 3:
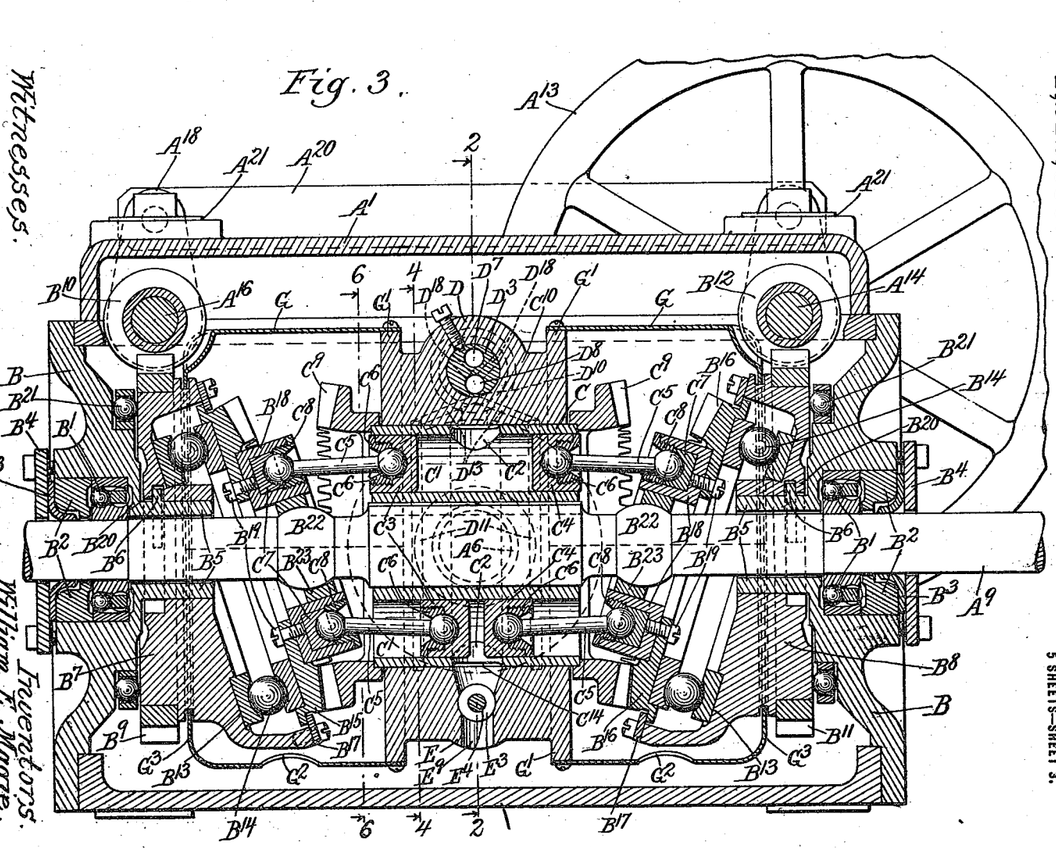
Fig. 3 is a longitudinal section through one member on the line 3—3 of Figs. 1 and 2.
Figure 4:
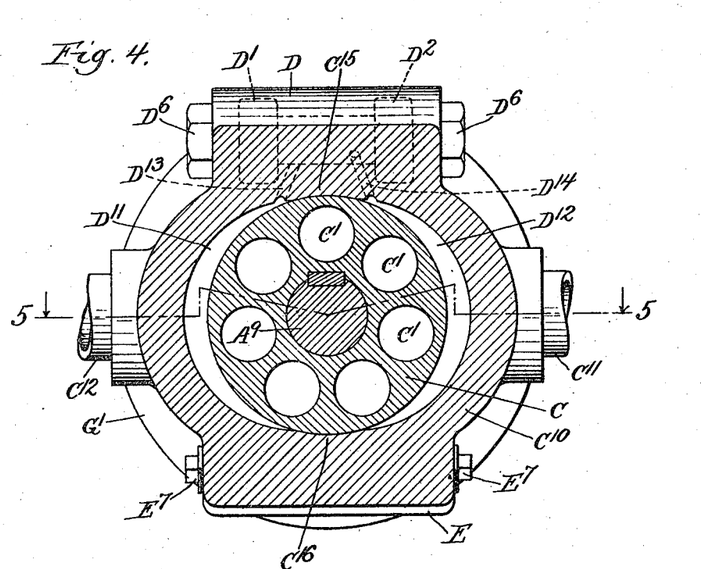
Fig. 4 is a detail cross section on the line 4—4 of Fig. 3 through one of the cylinders.
Figure 5:
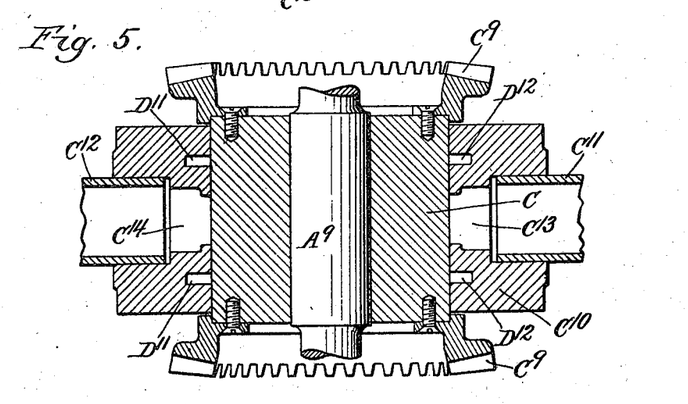
Fig. 5 is a cross section on the line 5—5 of Fig. 4.
Figure 6:
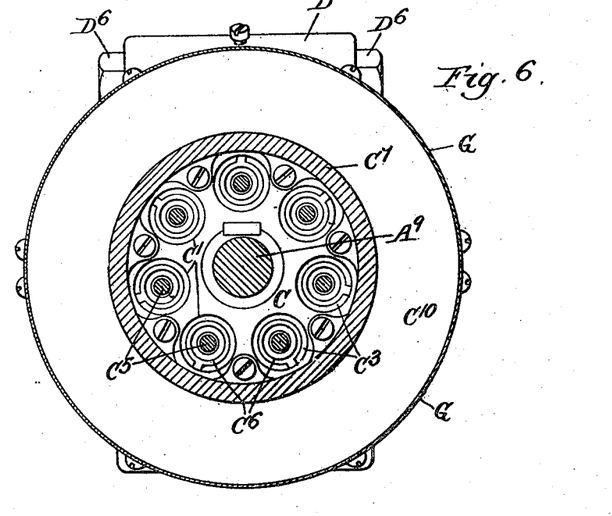
Fig. 6 is a section along the line 6—6 of Fig. 3.
Figures 7, 8:
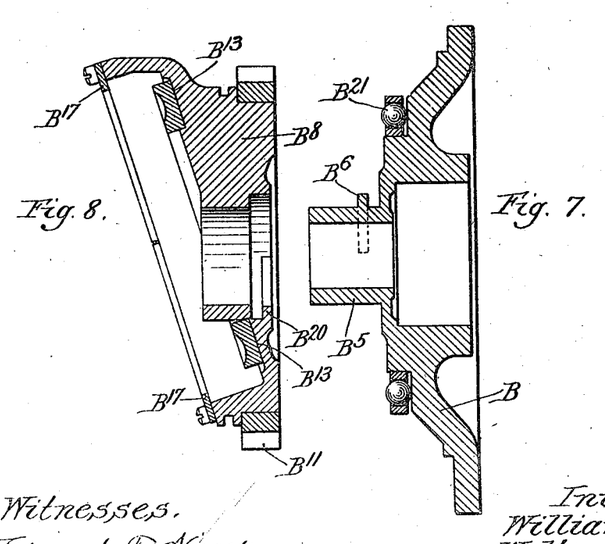
Fig. 7 is a detail of the end thrust plate.
Fig. 8 is a like detail of the inclined thrust plate.

*Adjustment.*—The adjustment may be carried on by any form of device, but we have illustrated one which comprises two worm shafts coupled together so as to be simultaneously driven from one and the same source of power. Each shaft meshes with the rotatable inclined thrust plate which is adapted to travel freely on the ball-bearing interposed between it and the end thrust plate. When the worm shafts are thus operated, the parts are related so that as one inclined thrust plate is rotated in one direction, the other is rotated in the opposite direction, and thus they may be adjusted from any position such as that illustrated in Fig. 3, where the angle between them is at a maximum to a point where their inclined surfaces are parallel to each other. During such adjustment from maximum angle to parallelism, the pistons controlled by the respective inclined thrust plates will be varied in their position so that their effective action will vary from the maximum as illustrated in Fig. 3 to a minimum, or where the pistons of each cylinder travel simultaneously at equal speeds in the same directions, the parts may be shifted from one such position to the other through the whole cycle without any very considerable effort on the part of the operator or without requiring any considerable power.

Assuming that the parts are in the position illustrated in the drawing where the two piston rings are inclined to each other so as to give their respective pistons their greatest travel, the pump is ready for its maximum fluid output. The rotation of its shaft causes the two pistons in the outer ends of a given cylinder to move toward each other, each passing through their fullest possible excursion and discharging the largest possible amount of oil into the circulatory system toward the motor, and what happens with one cylinder happens with each successive cylinder as it passes to the pressure side. If now we desire to reduce the speed of the motor, we can bring it about by varying the resultant of the excursion of the two pistons of each cylinder of the pump. This we can bring about by operating the hand wheel and thus driving the connecting mechanism whereby the thrust plates will be slightly rotated simultaneously in opposite directions, and this action can be carried so far that the two piston rings will be parallel to each other although still having the same angle of inclination to the shaft, for that will always be fixed as to each of them. This results, of course, in reducing the resultant of the excursions of the pistons of each cylinder to nothing, for as each advances, the other recedes at an equal rate and this being true of each cylinder on each side, the net result is that there is neither pressure nor suction and no oil is moved and the motor is at rest.

We have been describing the operation on the theory that the pump comprises cylinders with double pistons and rotary inclined thrust plates, while the motor comprises cylinders with single pistons and a non-rotatable inclined thrust plate. In such case the adjustment is carried on wholly by a manipulation expressed in the pistons of the pump. The motor is set for maximum speed and the adjustment is effected by varying the velocity of the oil in the circulatory system, as above pointed out. If, however, a wider range of adjustment is desired, the motor may take the same form as the pump. If now the motor be set for maximum speed, the pump may vary through all its phases from a minimum to a maximum speed of output, and thus the variation of the speed of the motor from a minimum to a maximum equal to that of the pump will be brought about as above provided for. We may now still further increase the speed of the motor by rotating its inclined thrust plate, for thus the flow of oil per revolution of motor from one port to the other will be diminished, and the result will be increased speed. This speed may be increased up to a point where the quantity of oil taken per revolution by the motor will reach a minimum when the motor shall have reached its highest practicable speed. This speed limit is fixed by the work given out by the oil used per revolution of motor. When the quantity of oil per revolution becomes so small that the oil has only enough energy to overcome the friction of the motor, there is no energy left for external work, the speed has reached a maximum. If the adjustment is carried beyond this point, the oil will pass through the motor from the port by way of the safety valve. Of course, this excess of adjustment is only suggested as a means of explaining the action.

*Circulatory system.*—The circulatory system consists preferably of two separated cases or chambers, one of which contains the moving parts of the driving mechanism or pump and the other the moving parts of the driven mechanism or motor and proper connecting pipes. Of course, it may assume a wide range of variation. We have illustrated it as above suggested. The total circulatory system also contains as an element a leakage return connection or fluid sump which is connected with the driving mechanism so that the leakage oil may be returned thereto.

The driving fluid is forced by the driving part through one pipe into the driven part, where it acts to set in motion the parts to be driven in a manner hereinafter to be more specifically described. The driving fluid passes, when it has performed its work, from the driven part into the return pipe or passage which leads it back to the driving part. The driving fluid is originally sufficient to fill all the parts of the circulatory system and a suitable amount of oil for that purpose should be supplied. It can be introduced into the driving and driven mechanisms in any desired manner as, for example, by means of the oil filling plugs. As soon as the mechanism begins to operate the driving fluid or oil, and we use these terms interchangeably although other fluids than oil could be employed, is put under considerable pressure and forced from the driving parts into the driven part. Now, if the parts require to be packed so as to retain all of this fluid at all times in a strictly defined circulatory system, there would, of course, be many and serious difficulties in the way.

It is a feature of our invention and apparatus that there are practically no packings and no confined or restricted passageways. Everything is open and free and the channels are of large cross-sectional area so that there will be a free and easy circulation throughout all the parts. This, of course, involves a maximum amount of leakage but makes for easy and free operation and high efficiency, provided the system in its working or pressure parts be kept full of oil. There should be supplied more than enough oil to fill the circulatory system of both pump and engine.

The chambers or passages at the top of the ring which connect with the ports are provided with removable air vent and filling plugs which when removed permit the introduction of oil and the escape of air so that the pump may be freed from air and filled with oil on starting. As the pump operates, it proceeds to force the oil into the motor and the oil leaking from the motor gradually fills or tends to fill the motor case. In the meantime, by so much as the motor leaks by so much will the return of oil to the pump through the circulatory system be insufficient and the deficiency must be supplied from the excess oil in the pump case. Such oil is introduced from the pump case into the pump and the circulatory system through the check valve at the bottom. Under ordinary conditions there will be a tendency to a vacuum on the suction side of the pump because of the oil leakage and deficiency of returning oil. If the pump is sending 100% of oil into the motor and the motor is leaking to the extent of 5%, the return on the suction side will be 95%, thus leaving a low pressure on the suction side. If now there be sufficient oil in the pump case to cover the passageway leading to that check valve which is associated with the suction side of the pump, and if the pressure on the surface of such oil in the case be atmospheric, then obviously the oil will be sucked up through the check valve into the system so as to supply the 5% deficiency.

Under certain speed conditions, the apparatus will operate in the manner just indicated, because the negative pressure on the suction side or port of the pump will be sufficient to overcome friction and the outward tendency due to centrifugal force exercised in the oil, which is being carried around in the cylinders and which is transmitted to the oil, thus attempting to enter through the check valve, and to leave a margin between such pressure and the atmospheric pressure in the pump case. If, however, the conditions of operations are such as to require it, or if for any reason it becomes desirable, the oil in the pump case can be forced into the pump positively by means of any forcing apparatus, as for example, by means of a stand-pipe connected with the pump casing. In this instance, of course, the pump casing will be substantially full of oil.

If the machine were intended to operate continuously in the same direction, it would not be necessary to have any check valve but a mere opening from the bottom part of the casing into the suction side of the pump would be sufficient. Since, however, the machine may be reversed and each side may be alternately the suction and the pressure side, it becomes necessary to have two leakage inlet passages, one for each port, and to control them by check valves. The check valve openings referred to are formed in the bottom of the ring and are provided with inwardly opening check valves so as to prevent egress of oil on the pressure side and permit its entry on the suction side. Other forms of valves could be substituted for the check valves, as, for example, a piston valve, but the operation would be the same. We do not, however, require or employ a specialized means for circulating the leakage oil or for conveying or forcing it into the pump. This, as above explained, is usually easily brought about by the mere atmospheric pressure. The leakage could, however, be pumped back into the circulatory system by an apparatus adapted to pump back just enough to supply the loss.

*Meaning of terms and expressions.*—By the term pump we refer to the driving parts or the parts which are intended to first receive and then through or by means of a circulating fluid impart motion to another part.

By the term driven part we refer to that portion of the device which is set in motion by the circulating fluid and which acts as a motor which is intended to be set in motion.

By the circulatory system we mean to refer to that system of pipes or passages or chambers by which a complete and so far as may be necessary closed or defined passageway is created which contains the driving and the driven parts.

By the expression leakage return system we refer to that arrangement of passages, pipes or connecting ways and their associated parts whereby the leakage is returned into proximity to the driving part and is subjected to such conditions as may be necessary to cause it to enter the circulatory system and thus accommodate for the loss therein by leakage.

By the term driving fluid we refer to that fluid, preferably oil, which is used in the circulatory system of the device.

By the term valve or valve ring or valve port ring we refer to that part of the mechanism through which the fluid from the circulating system is received into or withdrawn from either of the moving parts.

By the expression socket plate we refer to that plate or that socket plate which is permanently inclined to the shaft at one and the same angle and is adapted to receive one end of each piston rod on a given side of the cylinder.

By the term inclined thrust plate, we mean to refer to that piece of mechanism which supports in an inclined position the socket plate and which is itself adapted to be rotated around the shaft to vary its position of inclination.

By the expression adjusting means we refer to those means which are organized for the purpose of varying the effective throw of the pistons and specifically those means which are organized for the purpose of simultaneously rotating the inclined thrust plates in opposite directions to vary their angular relation.

By the expression pressure equalizing means we refer to those means by which the pressure on the opposite sides of the cylinder and shaft are equalized.

By the expression pressure relief means we refer to those means whereby excessive pressure in the circulatory system is accommodated.

By the term splash shield we refer to any kind of a hood or shield which will keep the oil in the case in comparative tranquillity or in a confined mass.

We claim:—

1. In a hydraulic transmission device a power member containing a group of cylinders, a shaft on which such cylinders are mounted and with which they operate, an inclosing valve port ring about the cylinders, a circulatory system with a loose connection between the same and the ring whereby all the parts are suspended on the shaft.

2. In a hydraulic transmission device a power member containing a group of cylinders, two pistons acting in each such cylinder, a shaft on which such cylinders are mounted and with which they operate, an inclosing valve port ring about the cylinders, a circulatory system with a loose connection between the same and the ring whereby all the parts are suspended on the shaft.

3. In a hydraulic transmission a cylinder barrel, a series of pistons therein, a shaft upon which the barrel is mounted, a driving plate, and a driving connection between the plate and the barrel comprising a pair of beveled gears one on the plate and one on the barrel, a ball and socket connection between the swash plate and the shaft.

4. In a pressure transmission system a pressure relief member comprising a chamber communicating with the system, a plug within said chamber, yielding means to resist movement of said plug, and a relief passage through said plug closed by the wall of said chamber adapted to be opened only after the plug has been displaced.

5. A hydraulic transmission system having two zones of different pressures, an elongated chamber interposed between them, a plug slidably mounted within said chamber, yielding means for resisting displacement of said plug in either direction, pressure relief passages contained within said plug communicating each with one of said zones, a discharge from the opposed end of each passage, said discharges being closed by the wall of the chamber when the plug is in the normal position, and adapted each to be opened by the movement of the plug in one direction or the other.

Signed at Evansville, Indiana, this 26 day of December, 1913.

WILLIAM E. MAGIE.

Witnesses for William E. Magie:
F. EWING GLASGOW,
D. J. CAMPBELL.

Signed at South Milwaukee, Wisconsin, this 19th day of December, 1913.

WALTER FERRIS.

Witnesses for Walter Ferris:
HARRY B. HAYDEN,
LILLIAN BRONSON.